Patented Jan. 1, 1946

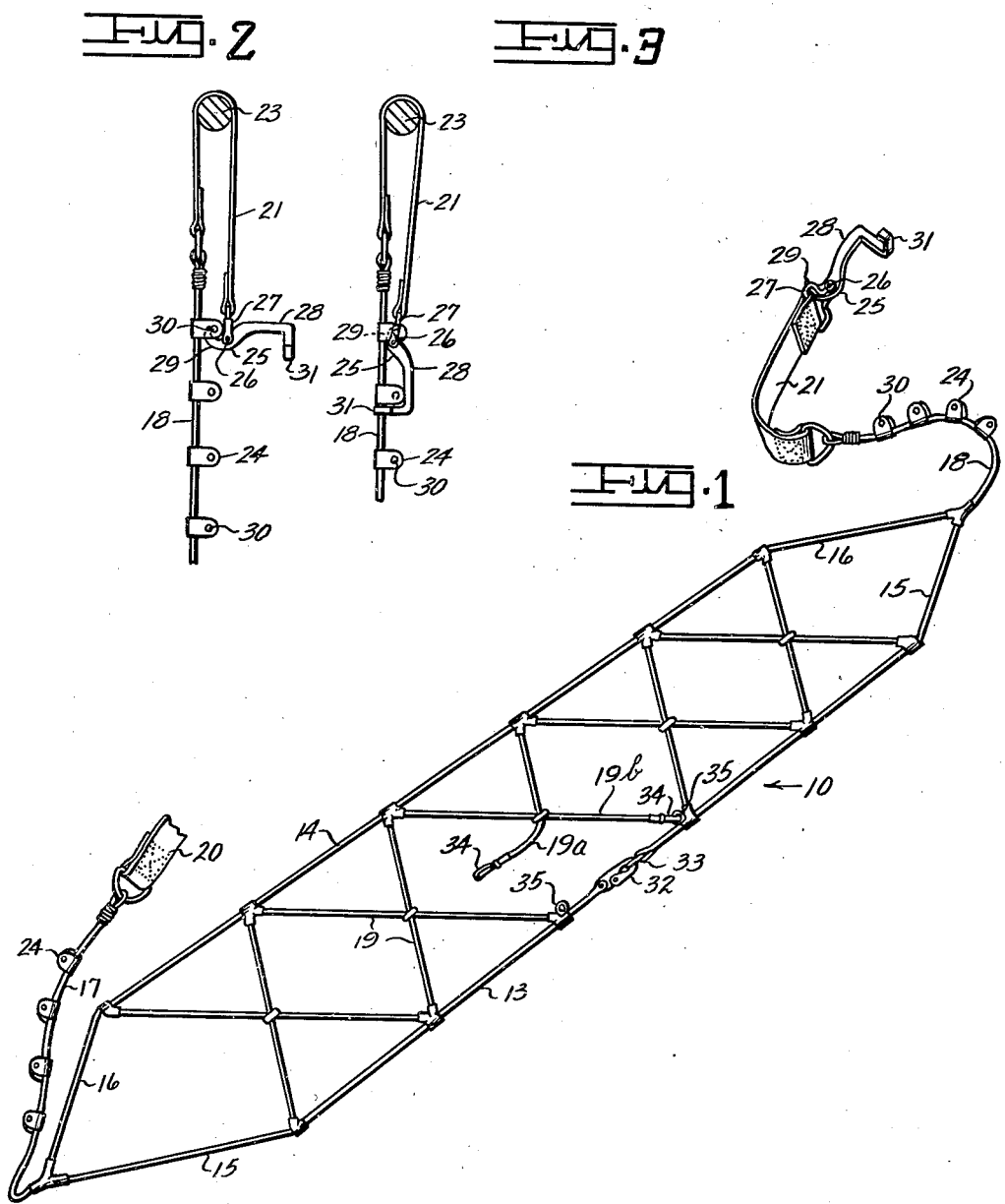

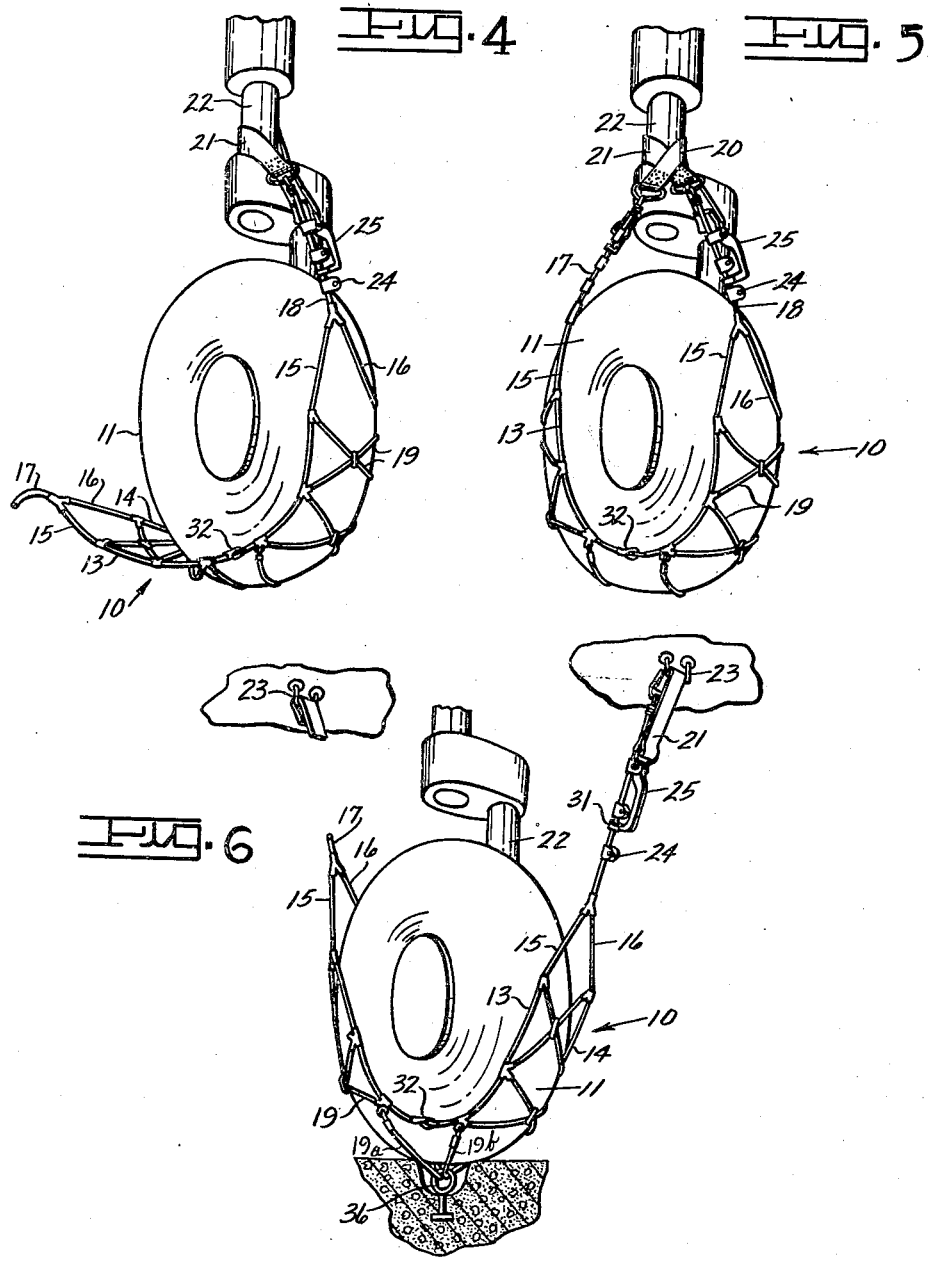

2,391,921

UNITED STATES PATENT OFFICE 2,391,921

AIRCRAFT ENFETTERING AND MOORING DEVICE

George W. Replogle, Dayton, Ohio

Application September 30, 1943, Serial No. 504,335

1 Claim. (Cl. 244—110)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to restraining, braking and mooring devices for wheel equipped aircraft and more particularly to a mat-like device for enfettering the wheels of aircraft.

It is the aim of the present invention to overcome the disadvantages and unsatisfactory results of conventional wooden or steel chocks wedged between the runway, hangar floor or concourse and the wheels, fore and aft thereof, and seeks to improve and supplement shackle type of restraining devices such as disclosed in United States Patent No. 1,673,608.

A further object of the invention is to provide a device for restraining the rotation of wheels, which device may be applied and removed without movement of the wheels. To apply restraining devices of the character, it has heretofore been necessary to lift or roll the wheel onto and off the device.

A still further object is to provide a restraining device which will restrain wheel rotation in either direction rather than forward rotation only, as will be found of functions of prior devices of the character.

Another object is to provide a restraining device which is adjustable and will readily adapt itself to use with various sizes of wheels having a variety of types of mountings.

Another object is to provide a restraining device having stretcher acting securing means in order that the restrainer may be firmly secured to prevent unintentional removal, such as by lateral thrusts, skidding, etc.

Still another object of the improved restraining device is to provide means whereby the device may be used in connection with fixed mooring attachments.

A still further object is to provide a restraining device which will not only prevent forward and rearward rotation of the wheels, but which will provide a maximum frictional contact between the wheels and the surface upon which they are brought to rest, which is highly desirable for wet and icy areas during wind storms and motor warming-up periods.

With the foregoing and other objects and aims in view, my invention resides in the combination of parts and in the details of construction hereinafter set forth in the following specification and appended claim, certain embodiments thereof having the characteristics of my invention and by which the same may be practiced being illustrated in the accompanying drawings in which:

Fig. 1 is an unmounted view of an embodiment of the improved aircraft wheel enfettering and mooring mat and securing means therefor;

Fig. 2, an illustrative view of an initial step in the application of the securing means of the mat;

Fig. 3, an illustrative view of the mat securing means in clamped position;

Fig. 4, a view in perspective, illustrative of the mat as partially applied;

Fig. 5, a perspective of an aircraft wheel illustrating a manner of applying an embodiment of the improved enfettering device; and Fig. 6, a view similar to that of Fig. 5, except that it is illustrative of an alternative manner of applying the device and further illustrative of the use of the enfettering mat as a mooring device.

The invention includes a mat 10 adapted to be applied envelopingly to a wheel 11 of an aircraft and secured by suitable securing means to members of the craft to prevent rotation of the wheels in either direction. The mat of the enfettering embodiment illustrated consists of a pair of spaced, substantially parallel border strands 13 and 14 which may be formed of chain, rope, links, wire or other suitable material and construction, secured together at their ends by converging portions or links 15 and 16 from which extend tie members 17 and 18. Intermediate the points of convergence, a series of cross members, webs or links 19 extend from one border strand 13 to the other 14 to form a mat. The end portions 20 and 21 of the tie members 17 and 18 are preferably, though not necessarily, nonmetallic and of strap-like construction in order that they may be readily looped about or through structural members 22 and 23 of the aircraft and without damage thereto as might be inflicted by metallic tie portions.

In order that the mat may be drawn taut about wheels or tires of various sizes, the tie members 17 and 18, intermediate the strap-like end portions and the converging portions of the border strands, are provided with a plurality of fixed clevises 24 and the ends of the strap-like portions 20 and 21 of the tie members are each provided with stretching and securing member 25 (see Figs. 1, 2 and 3) pivotally mounted as by a pin 26 of a clevis 27 carried by the strap-like member. The stretching and securing member 25 consists of a lever arm 28 which extends from one side of the pivot point 26 and a hook 29 projects from the other side. The hook 29 is adapted to be brought into engagement with a clevis pin 30 of a selected clevis 24 mounted upon the securing member 17, or 18, which pin serves as a pivot about which the lever may be moved to draw the tie member, secured to the lever at point 26, taut. The free end of the lever arm 28 is also provided with a hook 31 adapted to engage the tie member 17, or 18, and retain the lever in locked position.

In order that the enfettering device may be applied or removed without rolling the wheel onto the mat, one of the border strands 13, or 14, is provided with separable means at an intermediate point comprising a hook 32 and loop 33 whereby the mat may be drawn about the portion of the wheel which may be in contact with the ground and the strand 13 secured as a continuous member along the foremost face of the wheel in comparable relation with the strand 14 which may lie along the rear face of the wheel. Likewise, certain of the web members, such as cross links 19a and 19b, spanning or lying adjacent the separable portion of the border strand 13, are provided with a hook 34 and eye 35 whereby they may be applied about the ground-contacted portion of the wheel in the manner hereinbefore described without elevating the wheel.

In applying the mat to the wheel, the cross links 19a and 19b may be threaded through a mooring loop 36 embedded in the concourse, runway or hangar floor and thence snapped into the eyes 35 on the separable border strand 13. In this way the enfettering device serves as a mooring means to prevent, not alone rotation of the wheel but, movement of the aircraft from a fixed position. The grille area of the mat will serve as a frictional device, when applied simply as an enfettering device in the absence of fixed mooring means, to prevent a shifting of the plane upon wet and icy surfaces during high wind velocity and the warming-up of a plane.

Having described my invention and illustrated an embodiment by which the same may be practiced, what I claim is:

An aircraft enfettering device comprising a mesh-like mat having spaced border members connected by web members and adapted to encradle the lower portion of an aircraft wheel, tie members extending from opposite ends of said mat adapted to engage stationary members of an aircraft, and cooperative means on the end and intermediate portion of each of said tie members for releasably securing the tie members in engagement with said stationary members.

GEORGE W. REPLOGLE.